(12) United States Patent
Seki et al.

(10) Patent No.: US 11,465,512 B2
(45) Date of Patent: Oct. 11, 2022

(54) DRIVE FORCE CONTROL METHOD AND DRIVE FORCE CONTROL APPARATUS

(71) Applicant: Nissan Motor Co., Ltd., Kanagawa (JP)

(72) Inventors: Yoshinori Seki, Kanagawa (JP); Yohei Nakamura, Kanagawa (JP); Takashi Nanjo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 205 days.

(21) Appl. No.: 16/954,033

(22) PCT Filed: Dec. 15, 2017

(86) PCT No.: PCT/JP2017/045168
§ 371 (c)(1),
(2) Date: Jun. 15, 2020

(87) PCT Pub. No.: WO2019/116555
PCT Pub. Date: Jun. 20, 2019

(65) Prior Publication Data
US 2021/0078410 A1 Mar. 18, 2021

(51) Int. Cl.
*B60L 15/20* (2006.01)

(52) U.S. Cl.
CPC ......... *B60L 15/20* (2013.01); *B60L 2240/14* (2013.01); *B60L 2240/421* (2013.01);
(Continued)

(58) Field of Classification Search
CPC ............... B60L 15/20; B60L 2240/14; B60L 2240/421; B60L 2240/423; B60L 2240/12;
(Continued)

(56) References Cited

U.S. PATENT DOCUMENTS

2015/0069685 A1* 3/2015 Kim ............... F16F 3/0873
267/141

FOREIGN PATENT DOCUMENTS

JP   2005-051832 A   2/2005
JP   2012105461 A    5/2012
(Continued)

OTHER PUBLICATIONS

Rhett Allain; "Do Rubber Bands Act Like Springs?;" Science; Aug. 8, 2012; XP55752447A; Retrieved from the Internet: URL: http://www.wired.com/2012/08/do-rubber-bands-act-like-springs/ (6 pages).

*Primary Examiner* — Michael J Zanelli
(74) *Attorney, Agent, or Firm* — Osha Bergman Watanabe & Burton LLP

(57) ABSTRACT

A drive force control part 5 controls a drive force such that a force caused by a change in the drive force to rearwardly tilt a drive source 1 and push a mount member is made smaller than an external force threshold value. In a first region in which the drive force is equal to or above a predetermined lower limit value, the drive force control part 5 limits a change rate per unit time of the drive force to or below a predetermined maximum rate, and in a second region in which the drive force is smaller than the lower limit value, does not limit the change rate per unit time of the drive force to or below the maximum rate.

7 Claims, 4 Drawing Sheets

(52) U.S. Cl.
CPC ..... *B60L 2240/423* (2013.01); *B60L 2250/28* (2013.01); *B60Y 2306/09* (2013.01)

(58) Field of Classification Search
CPC .. B60L 2240/443; B60L 2250/28; B60L 7/18; B60Y 2306/09; Y02T 10/72; Y02T 10/64; B60K 1/00; B60W 30/20
See application file for complete search history.

(56) References Cited

FOREIGN PATENT DOCUMENTS

| | | |
|---|---|---|
| JP | 2012154471 A | 8/2012 |
| JP | 2015-133799 A | 7/2015 |

\* cited by examiner

DRIVE FORCE CONTROL METHOD AND DRIVE FORCE CONTROL APPARATUS

TECHNICAL FIELD

The present invention relates to a drive force control method and a drive force control apparatus.

BACKGROUND ART

There is disclosed a prior art (refer to Patent Literature 1) that, at the time of acceleration from a braked state, relaxes a torque change around a torque of 0, thereby suppressing a gear tooth hammering shock.

CITATION LIST

Patent Literature

Patent Literature 1: Japanese Unexamined Patent Application Publication No. 2005-51832

SUMMARY OF INVENTION

Problems to be Solved by Invention

However, although the above-mentioned prior art is able to suppress the gear tooth hammering shock, it is unable to provide an effect of reducing a strange noise generated from a vehicle.

In consideration of the above-mentioned problem, an object of the present invention is to provide a drive force control method and a drive force control apparatus, capable of reducing a strange noise from a vehicle.

Means to Solve Problems

A drive force control method according to an aspect of the present invention makes a force, which is caused by a change in a drive force and tilts a drive source rearward to push a mount member, smaller than an external force threshold value by limiting, in a first region in which the drive force is equal to or above a predetermined lower limit value, a change rate per unit time of the drive force to or below a maximum rate.

Effects of Invention

According to the present invention, a strange noise from a vehicle can be reduced.

MODE OF IMPLEMENTING INVENTION

With reference to the drawings, an embodiment of the present invention will be explained in detail. In the explanation, the same objects are represented with the same reference marks to omit repetitive explanation.

Figure 1:
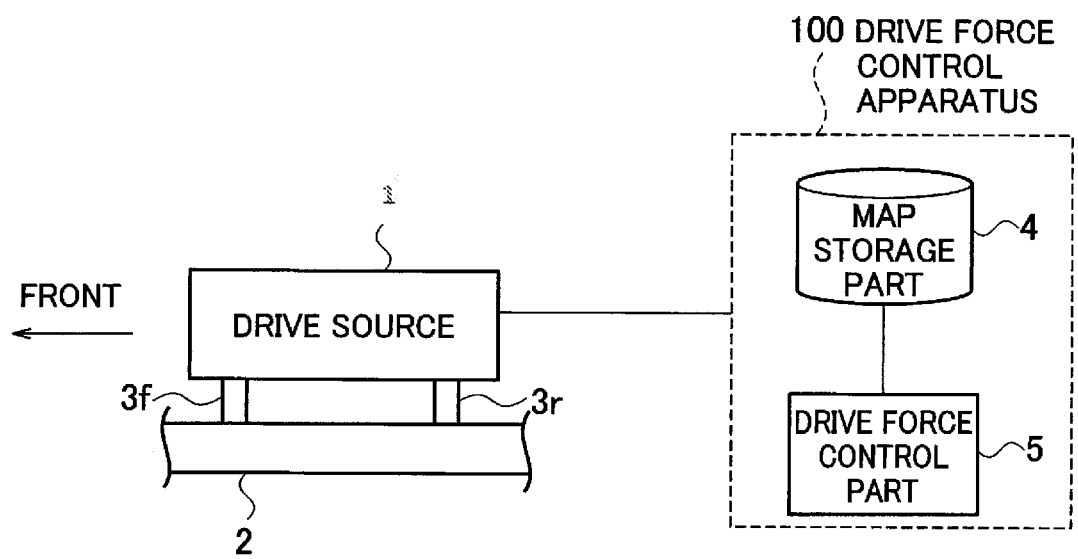
FIG. 1 is a block diagram illustrating a drive force control apparatus and a part of a vehicle according to an embodiment.

As illustrated in FIG. 1, in a vehicle of the embodiment (hereunder called an own vehicle), a drive source is mounted on a vehicle body 2 (a so-called chassis) through rubber-made mount members 3f and 3r. The mount member 3f is arranged at a front part of the drive source 1 and the mount member 3r is arranged at a rear part of the drive source 1. For example, the mount members 3f and 3r each are composed of a left piece and a right piece.

The drive source 1 generates a drive force T (torque) and is here a motor. Namely, the own vehicle is a motor vehicle, and to reduce the frequency of a brake operation by a driver, generates a negative drive force T (a regenerative force) when an accelerator operation is lost. In most cases, only with an accelerator, it is possible to accelerate and decelerate the own vehicle. Also, the drive source 1 (motor) is supplied with electricity from a battery.

Further, an internal combustion engine installed on the own vehicle rotates a generator that generates electricity to charge the battery. By the way, the internal combustion engine may serve as the drive source 1. In this case, it is not necessary to install the battery and generator. Also, the drive source 1 may be constituted to include a transmission.

Further, the own vehicle is provided with a drive force control apparatus 100 including a map storage part 4 and a drive force control part 5.

The map storage part 4 stores a map M indicating a relationship between the drive force T and a change rate R per unit time of the drive force T (hereunder, sometimes simply called the change rate R). The change rate R may be called a gradient of change of the drive force T, a rate of change of the drive force T, or the like. The drive force control part 5 controls, according to the map M, the drive force T generated by the drive source 1. By the way, the map M may be incorporated in a program of the drive force control part 5, to make the map storage part 4 unnecessary.

The drive force T of the positive applies a forward force to the vehicle body 2 and the drive force T of the negative applies a rearward force to the vehicle body 2. The drive force T of the negative at the time when the own vehicle is moving forward is called a regenerative force. Namely, in the case of losing an accelerator operation when the own vehicle is moving forward, the regenerative force (the drive force T of the negative) is produced and the own vehicle decelerates. The regenerative force is usable for charging the battery.

The drive force control apparatus 100 is a general-purpose microcomputer provided with a CPU (central processing unit), a memory, and an input/output part. The drive force control apparatus 100 is installed with a computer program (a drive force control program) to function as the drive force control apparatus. By executing the computer program, the drive force control apparatus 100 functions as a plurality of information processing circuits (4 and 5). Although the plurality of information processing circuits (4 and 5) explained here are examples that are realized by software, it is naturally possible to prepare exclusive-use hardware for executing information processes mentioned below, to constitute the information processing circuits (4 and 5). Further, the plurality of information processing circuits (4 and 5) may be formed with individual hardware pieces. In addition, the information processing circuits (4 and 5) may be in common with electronic control units (ECUs) used for other control purposes concerning the vehicle.

Figure 2:
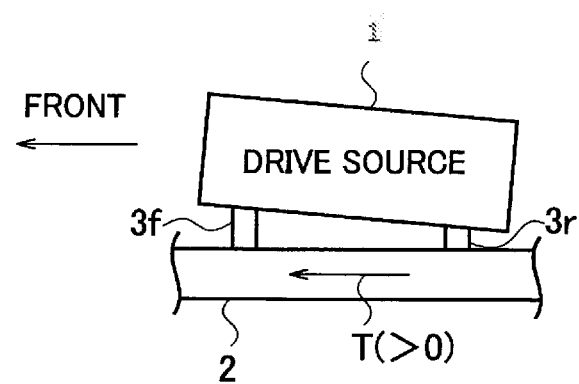
FIG. 2 is a schematic view illustrating a situation that a drive source 1 rearwardly tilts to compress a rubber-made mount member 3r.

As illustrated in FIG. 2, the drive force T of the positive applies a forward force to the vehicle body 2. And, as the drive force T of the positive increases, the drive source 1 rearwardly tilts (inclines backward), to push and compress the rear mount member 3r. The force created by the rearward tilt of the drive source 1 to push the mount member 3r is called an external force N.

Figure 3:
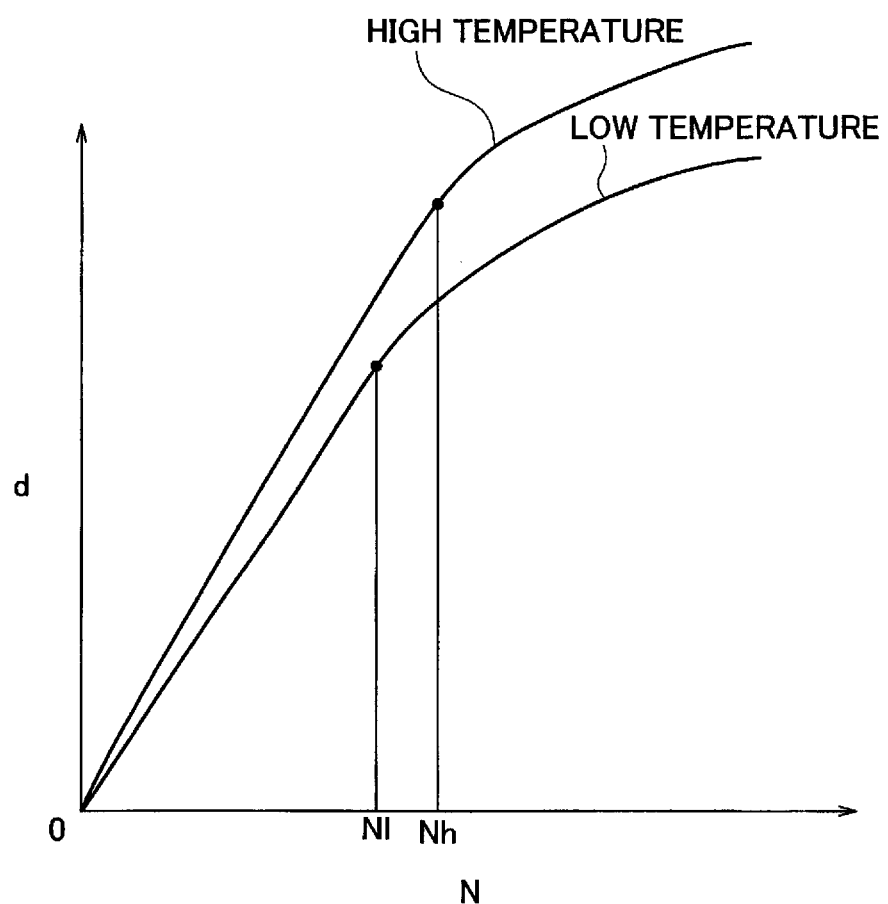
FIG. 3 is a view illustrating a relationship between an external force applied to the mount member 3r and a compressed amount d of the mount member 3r.

In FIG. 3, an ordinate d is a compressed amount of the mount member 3r compressed by the external force N. Only when the external force N on an abscissa is smaller than a predetermined external force threshold value (Nl, Nh), the mount member 3r is linearly compressed with respect to the external force N. And, when the external force N is equal to or above the above-mentioned external force threshold value (Nl, Nh), it is nonlinearly compressed. In a region in which the compressed amount d nonlinearly changes (called a nonlinear region), compared to a region in which the d linearly changes (called a linear region), the compressed amount with respect to the external force N is smaller. In the own vehicle, as the mount member 3r is rapidly compressed from in the linear region to the nonlinear region, it generates a sound (strange noise) and this strange noise must be reduced. It is preferable to realize the highest effect of nullifying (suppressing) the sound.

Also, the external force threshold value Nl for low temperature is lower than the external force threshold value Nh for high temperature. Namely, the lower the temperature of the mount member 3r (for example, an ambient temperature around the mount member) is, the lower the external force threshold value is. This means that, at a low temperature, compared to at a high temperature, even a low external force generates a sound (strange noise).

Figure 4:
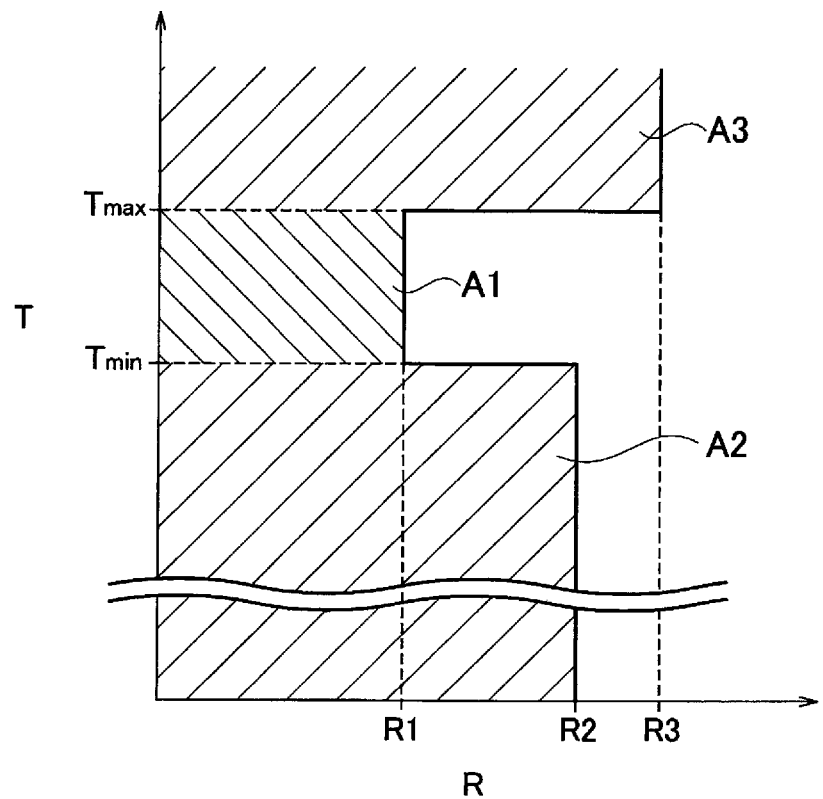
FIG. 4 is a view illustrating a relationship between a drive force T and a change rate R per unit time of the drive force T.

FIG. 4 illustrates the map M, i.e., a relationship between the drive force T and the change rate R per unit time of the drive force T. The drive force control part 5 basically generates, according to an accelerator operation, the drive force T of the positive to apply a forward force to the vehicle body 2. Also, if the accelerator operation is disabled during the forward movement of the own vehicle, it generates the drive force T of the negative (regenerative force) to decelerate the own vehicle. Also, the drive force control part 5 controls, separately from the basic control, the drive force T according to the map M.

More precisely, as indicated in the map M, if the drive force T in a second region A2 lower than a lower limit value Tmin is changed to the drive force T in a first region A1 equal to or above the lower limit value Tmin and equal to or below an upper limit value Tmax, the drive force control part 5 limits, in any period during the change, the change rate R per unit time of the drive force T to or below a maximum rate R1. Namely, even a maximum change rate R during the change is limited to or below the maximum rate R1. For example, the change rate R is fixed during the change and this change rate R is limited to or below the maximum rate R1.

On the other hand, within the second region A2 or within a third region A3 in which the drive force T is greater than the upper limit value Tmax, the change rate R is not limited to or below the maximum rate R1. This is because the mount member 3r generates no or little sound.

In more detail, as indicated in the map M, in the second region A2, the change rate R is limited to or below a maximum rate R2 (>R1), and in the third region A3, the change rate R is limited to or below a maximum rate R3 (>R1).

The maximum rate R1 is set so that the external force N is smaller than the external force threshold value even if the external force N becomes maximum at the time when the drive force T in the second region A2 changes to the drive force T in the first region A1.

Namely, by setting the maximum rate R1 in this way, the force (N) pushing the mount member 3r becomes smaller than the external force threshold value even when the drive force control part 5 changes the drive force T in the second region A2 to the drive force T in the first region A1 (on condition that the change rate R in the first region A1 is equal to or below the maximum rate R1). As a result, the sound (strange noise) from the mount member 3r can be reduced (or suppressed).

The lower limit value Tmin is set to or around 0 (zero). The upper limit value Tmax is set as a positive value larger the lower limit value Tmin. This is because, if the foot removed from an accelerator pedal again depresses the accelerator pedal rapidly, the regenerative force will rapidly decrease and the drive force T will change to the positive, and then, in a case where the mount member 3r is rapidly compressed from in the linear region to the nonlinear region the mount member 3r will produce the sound (strange noise). Such a sound (strange noise) caused at the time of rapid acceleration by accelerator work can be reduced (suppressed). Also, when a road slope or a wind applies a force to the own vehicle, it is preferable to adjust the lower limit value Tmin, and therefore, the lower limit value Tmin is not limited to 0 (zero).

Because the change rate R is limited to or below the maximum rate R1 in the first region A1, in the second region A2 and third region A3 the mount member 3r is not rapidly compressed from in the linear region to the nonlinear region, and then the mount member 3r basically generates no (or little) sound (strange noise). And therefore, unlike the above, the change rate R is not limited to or below the maximum rate R1 in the second region A2 and the third region A3. Accordingly, the drive force control to limit the change rate R to or below the maximum rate R1 is achievable only in a required range. With this, in the second region A2 and third region A3, responsiveness of the drive force T can be improved.

Also, the drive force control part 5 makes the maximum rate R1 lower as the temperature (ambient temperature) of the mount member 3r decreases, and with the use of the adjusted maximum rate R1, controls the drive force T as mentioned above.

Accordingly, without regard to the temperature of the mount member 3r, the sound (strange noise) from the mount member 3r can be reduced (suppressed) at any temperature.

Figure 5:
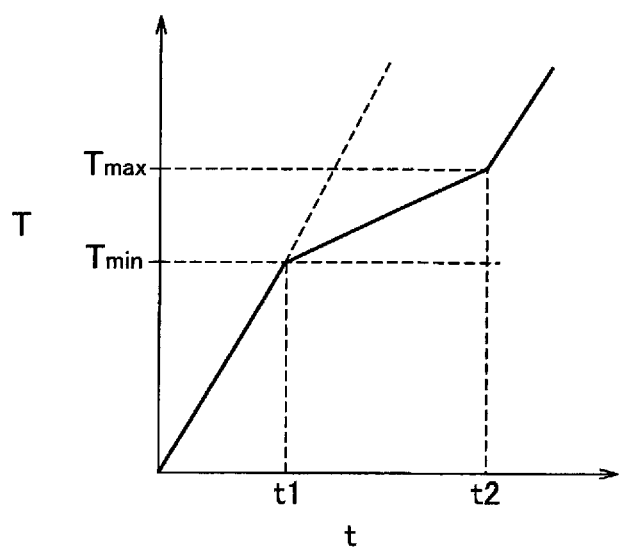
FIG. 5 is a view illustrating a relationship between time t and the drive force T.

As illustrated in FIG. 5, in a scene the drive force T increases, it is supposed that the drive force T reaches to the lower limit value Tmin at time t1 and to the upper limit value Tmax at time t2.

Compared to a gradient (i.e., the change rate R) of the drive force T at the time when the drive force T is smaller than the lower limit value Tmin, i.e., before the time t1, a gradient (change rate R) of the drive force T at the time when the drive force T is equal to or above the lower limit value min, i.e., after the time t1 is smaller.

Also, compared to a gradient (change rate R) of the drive force T at the time when the drive force T is greater than the upper limit value Tmax, i.e., after time t2, the gradient (change rate R) of the drive force T at the time when the drive force T is equal to or below the upper limit value Tmax, i.e., before the time t2 is smaller.

As a result, between the time t1 and t2, the external force N becomes smaller than the external force threshold value to reduce (suppress) the sound (strange noise) from the mount member 3r. In particular, as mentioned above, the lower limit value Tmin is set to or around 0, and therefore, it is possible to reduce (suppress) the sound (strange noise) caused by a rapid acceleration due to the accelerator work that the foot removed from the accelerator pedal again rapidly depresses the accelerator pedal.

On the other hand, at a time before the time t1 and at a time after the time t2, i.e., in a region other than the first region A1, the mount member 3r basically generates no (or little) sound (strange noise), and therefore, the gradient (change rate R) of the drive force T is increased. Namely, in a region other than the first region A1, the change rate R is not limited to or below the maximum rate R1, to improve responsiveness of the drive force T.

As mentioned above, in the embodiment, the drive source of the vehicle is installed on the vehicle body of the vehicle through the rubber-made mount member, and the mount member linearly shrinks only when an external force smaller than the external force threshold value is applied thereto. And, when an external force equal to or above the external force threshold value is applied thereto, it generates a sound (strange noise).

In the embodiment, a force that is caused by a change in the drive force and tilts the drive source rearward to push the mount member is made smaller than the external force threshold value. To achieve this, in the first region in which the drive force is equal to or above the lower limit value, a change rate per unit time of the drive force is limited to or below a maximum rate (R1). On the other hand, in the second region in which the drive force is smaller than the lower limit value, the change rate per unit time of the drive force is not limited to or below the maximum rate (R1).

As a result, the mount member pushing force becomes smaller than the external force threshold value, to reduce the sound (strange noise) to be generated when the pushing force is equal to or above the external force threshold value. If the highest effect is obtainable, the sound will be nullified (suppressed). Further, in the second region, responsiveness of the drive force can be improved.

Also, in the third region in which the drive force is greater than the upper limit value, the change rate per unit time of the drive force is not limited to or below the maximum rate (R1), and therefore, the drive force control to limit the change rate to or below the maximum rate (R1) is executable only in a required range, thereby improving responsiveness of the drive force in the third region.

Also, the lower the temperature of the mount member is, the lower the maximum rate R1 is made, and therefore, without regard to the temperature of the mount member, the sound (strange noise) can be reduced (or suppressed) at any temperature.

Also, the drive source of the vehicle is a motor, and when an accelerator operation of the vehicle is lost, a negative drive force is generated. When the drive force is in the first region equal to or above the lower limit value and equal to or below the upper limit value, the change rate per unit time of the drive force is limited to or below the maximum rate (R1). On the other hand, when the drive force is in the second region smaller than the lower limit value or in the third region greater than the upper limit value, the change rate is not limited to or below the maximum rate (R1).

Accordingly, in a motor vehicle that reduces the frequency of a brake operation of a driver by generating a negative drive force when an accelerator operation is disabled, an attitudinal change of the drive source (motor) can be reduced (or suppressed) and a sound or vibration to be generated from parts (mount members or parts other than the mount members) by the attitudinal change can be reduced (or suppressed).

Modifications 1 and 2 will be explained as modifications of the embodiment. In the modifications, those other than the contents to be explained below are similar to those of the above-mentioned embodiment, and therefore, repetitive explanation is omitted.

Modification 1

In the Modification 1, according to a relationship between a revolution velocity V of the drive source 1 and a maximum value of the drive force T, in a region of the rotation speed V in which the sum Td of a positive maximum value TP of the drive force T and a negative maximum value TM of the drive force T is greater than a predetermined drive force threshold value Tdth, the change rate R per unit time of the drive force T is limited to or below the maximum rate R1.

The maximum values TP and TM are an absolute value of the positive maximum value of the drive force T and an absolute value of the negative maximum value of the drive force T, respectively, and are considered to be always positive values. Accordingly, the sum Td is a positive value.

The drive force threshold value Tdth is set such that, without limiting the change rate R per unit time of the drive force T, when the drive force T of the negative having the maximum value TM is changed to the drive force T of the positive having the maximum value TP, i.e., when the drive force T is increased, a force pushing the mount member 3r reaches to the external force threshold value.

As mentioned before, the drive source 1 is a motor, and therefore, a rotor rotates to generate the drive force T. A rotation speed of the rotor is called the revolution velocity V. The revolution velocity V is proportional to a vehicle velocity v of the own vehicle when a gear ratio of a transmission is unchanged.

Figure 6:
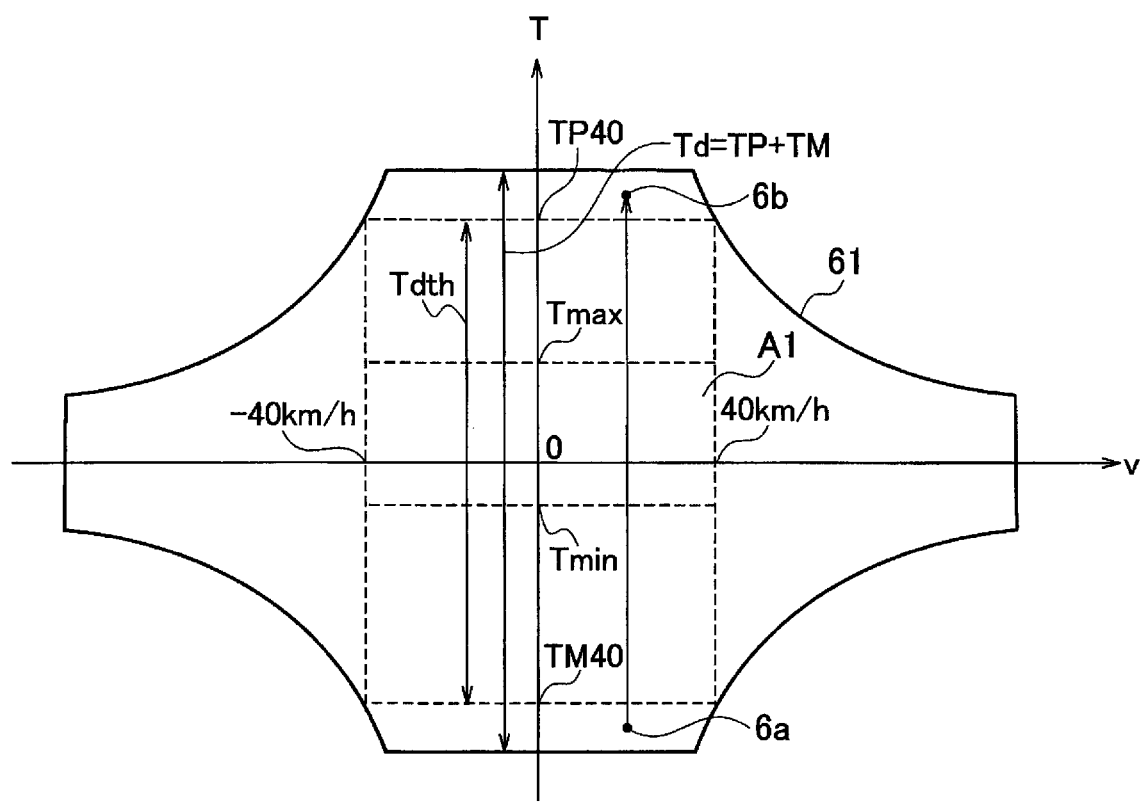
FIG. 6 is a view explaining a drive force control method according to a Modification 1, in which an abscissa is a vehicle velocity v and an ordinate a maximum value of the drive force T.

A characteristic curve 61 of FIG. 6 illustrates a relationship between the vehicle velocity v and the maximum values of the drive force T. For example, when an accelerator operation is conducted to move the own vehicle forward at a vehicle velocity v of 40 km/h, the drive force T of the positive can be generated up to a maximum value TP40 at the maximum. In this state, if the accelerator operation is released, the drive force T of the negative can be generated (switched) up to a maximum value TM40 at the maximum. The maximum value TM40 is a regenerative force maximum value at 40 km/h.

In this way, at the same vehicle velocity v, the drive force of the positive and the drive force of the negative can be generated. Also, the revolution velocity V is proportional to the vehicle velocity v, and therefore, it can be said that the drive source 1 is able to generate, according to the revolution velocity V, the drive force T of the positive to apply a forward force to the vehicle body and the drive force T of the negative to apply a rearward force to the vehicle body.

And, in the Modification 1, in a region of the revolution velocity V in which the sum Td of the maximum value TP and maximum value TM exceeds the drive force threshold value Tdth, the change rate R per unit time of the drive force T is limited to or below the maximum rate R1.

FIG. 6 illustrates, as an example, that, in a region from −40 km/h to +40 km/h, the sum Td of the positive maximum value TP (the absolute value TP40) of the drive force T and the negative maximum value TM (the absolute value TM40) of the drive force T on the characteristic curve 61 is greater than the drive force threshold value Tdth.

In this case, in the region from −40 km/h to +40 km/h, i.e., in a region of the revolution velocity V corresponding to that region, when the drive force T in the second region A2 is changed to the drive force T in the first region A1, the change rate R per unit time of the drive force T during the change is limited to or below the maximum rate R1. A reference mark A1 indicates a region corresponding to the first region A1 where the drive force T is equal to or above the lower limit value Tmin and equal to or below the upper limit value Tmax. The lower limit value Tmin is set to or around 0. FIG. 6 illustrates, as an example, the lower limit value Tmin lower than 0.

For example, a case that a state 6a (a state that the drive force T of the negative exceeding the maximum value TM is generated) is changed to a state 6b (a state that, at the same vehicle velocity, the drive force T of the positive exceeding the maximum value TP is generated) will be explained. Namely, the vehicle velocity v is maintained and the drive force T of the negative is changed to the drive force T of the positive. In this case, the drive source control part 5 limits, during the change, the change rate R per unit time of the drive force T to or below the maximum rate R1.

In the region of the revolution velocity V in which the sum Td exceeds the drive force threshold value Tdth, the change rate R per unit time of the drive force T must be limited to or below the maximum rate R1. Otherwise, when an accelerator work that the foot removed from the accelerator pedal again rapidly depresses the accelerator pedal is carried out, the mount member 3r produces a very large sound (strange noise). Namely, when the state indicated with a point 6a is suddenly changed to the state indicated with a point 6b, a large sound (strange noise) occurs.

The maximum value TM is a negative maximum value of the drive force T before the acceleration by such an accelerator work and the maximum value TP is a positive maximum value of the drive force T after the acceleration by such an accelerator work.

In the Modification 1, in the region of the revolution velocity V in which the sum Td exceeds the drive force threshold value Tdth, the change rate R per unit time of the drive force T is limited to or below the maximum rate R1. With this, the force pushing the mount member 3r becomes smaller than the external force threshold value, and therefore, it is possible to reduce (or suppress) a very large sound (strange noise) from the mount member 3r to be caused by a rapid acceleration due to the above-mentioned accelerator work or the like.

Modification 2

In the Modification 2, at the time when the own vehicle moves rearward or is stopped, even in the first region A1, i.e., even when the drive force T in the second region A2 is changed to the drive force T in the first region A1, the change rate R per unit time of the drive force is not limited to or below the maximum rate R1.

Figure 7:
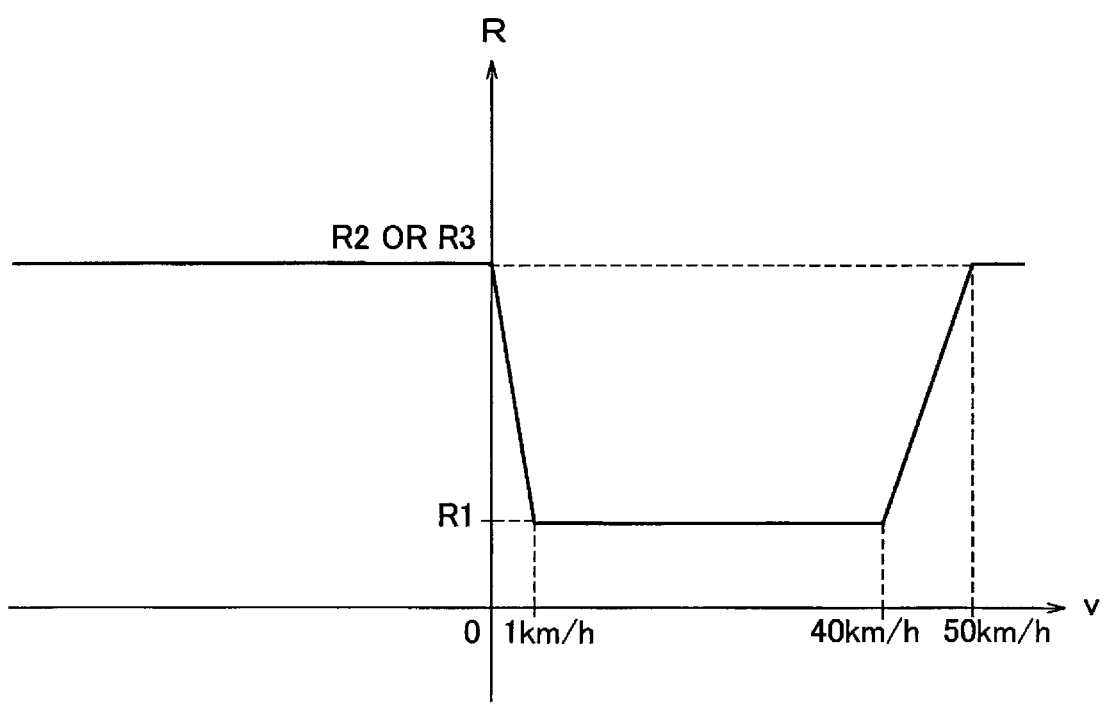
FIG. 7 is a view explaining a drive force control method according to a Modification 2, in which an abscissa is the vehicle velocity v and an ordinate the change rate R per unit time of the drive force.

FIG. 7 illustrates a relationship in the Modification 2 between the vehicle velocity v and the change rate R per unit time of the drive force. In the Modification 1, in a region of, for example, −40 km/h to +40 km/h, the change rate R is limited to or below the maximum rate R1. This region is further narrowed in the Modification 2.

According to the Modification 2, as illustrated in FIG. 7, if the vehicle velocity v is equal to or below 1 km/h, the change rate R is not limited to or below the maximum rate R1 and is limited to or below, for example, a maximum rate R2 (>R1) or a maximum rate R3 (>R1). Namely, at the time of stoppage when the vehicle velocity v is 0 (zero) and at the time of rearward movement when the vehicle velocity v is negative, no limitation is conducted.

In the Modification 2, because a rapid acceleration from the rearward movement or from the stoppage hardly occurs on a day-to-day basis, and therefore, the change rate R per unit time of the drive force is not limited to or below the maximum rate R1, thereby more emphasizing the responsiveness of the drive force T than the suppression of the sound (strange noise) from the mount member 3r. Namely, the controlling of the sound at the time when the own vehicle moves rearward or is stopped is not emphasized, thereby improving the responsiveness of the drive force T.

By the way, in the Modification 2, it is possible to find an upper limit of the revolution velocity V or of the vehicle velocity v (for example, +40 km/h) for limiting the change rate R according to the sum Td like the Modification 1. However, it is not limited to this. For example, like the embodiment, it is possible not to particularly set the upper limit of the revolution velocity V or of the vehicle velocity v for limiting the change rate R.

By the way, the embodiment installs the drive force control apparatus on the own vehicle. However, the drive force control apparatus may be installed in a server device capable of communicating with the own vehicle or in a second vehicle other than the own vehicle, so that necessary information and instructions are transmitted/received between the own vehicle and the server device or the second vehicle, thereby remotely achieving a similar drive force control method. Communication between the own vehicle and the server device is achievable by wireless communication or road-to-vehicle communication. Communication between the own vehicle and the second vehicle is achievable by so-called vehicle-to-vehicle communication.

In the above, the embodiment of the present invention is mentioned. It must not be understood that the descriptions and drawings that form a part of this disclosure limit the present invention. This disclosure will clarify, for the persons skilled in the art, various modifications, alternative embodiments, and practical techniques.

The functions mentioned in the above embodiment can be implemented with one or a plurality of processing circuits. The processing circuits include programmed processing devices such as processing units including electric circuits. Also, the processing devices include application specific integrated circuits (ASICs) arranged for executing the functions mentioned in the embodiment, devices such as conventional circuit parts, and the like.

DESCRIPTION OF REFERENCE NUMERALS

1: Drive source
2: Vehicle body
3f, 3r: Rubber-made mount member
4: Map storage part
5: Drive force control part 100: Drive force control apparatus
A1: First region
A2: Second region
A3: Third region
d: Compressed amount of mount member
N: External force applied to mount member (Mount member pushing force)
Nl: External force threshold value (for low temperature)
Nh: External force threshold value (for high temperature)
M: Map
R: Change rate per unit time of drive force
R1: Maximum change rate per unit time of drive force in first region
R2: Maximum change rate per unit time of drive force in second region
R3: Maximum change rate per unit time of drive force in third region
T: Drive force
Tmin: Lower limit value of drive force in first region
Tmax: Upper limit value of drive force in first region
V: Revolution velocity of drive source (motor)
v: Vehicle velocity
TP: Positive maximum value of drive force
TM: Negative maximum value of drive force
Td: Sum of positive maximum value of drive force and negative maximum value of drive force
Tdth: Drive force threshold value

The invention claimed is:

1. A drive force control method of a drive force control apparatus for controlling a drive force of a vehicle, wherein a drive source of the vehicle is mounted on a vehicle body of the vehicle through a rubber-made mount member, and the mount member is linearly compressed only when an external force smaller than a predetermined external force threshold value is applied thereto, the method comprising:
    controlling a force, which is caused by a change in the drive force and tilts the drive source rearward to push the mount member, to be smaller than the external force threshold value, wherein
    in a first region in which the drive force is equal to or above a predetermined lower limit value, a change rate per unit time of the drive force is limited to or below a predetermined maximum rate, and
    in a second region in which the drive force is smaller than the lower limit value, the change rate per unit time of the drive force is not limited to or below the maximum rate.

2. The drive force control method as set forth in claim 1, wherein
    in a third region in which the drive force is greater than a predetermined upper limit value, the change rate per unit time of the drive force is not limited to or below the maximum rate.

3. The drive force control method as set forth in claim 1, wherein
    the drive source is able to generate, according to a revolution velocity of the drive source, the drive force positively to apply a forward force to the vehicle body and negatively to apply a rearward force to the vehicle body; and
    in a region of the revolution velocity in which the sum of a maximum value of the drive force of the positive and a maximum value of the drive force of the negative exceeds a predetermined drive force threshold value, the change rate per unit time of the drive force is limited to or below the maximum rate.

4. The drive force control method as set forth in claim 1, wherein
    when the vehicle moves rearward or is stopped, the change rate per unit time of the drive force is not limited to or below the maximum rate even in the first region.

5. The drive force control method as set forth in claim 1, wherein
    the lower a temperature of the mount member is, the lower the maximum rate is made.

6. A drive force control method of a drive force control apparatus for controlling a drive force of a vehicle, wherein a drive source of the vehicle is a motor mounted on a vehicle body through rubber-made mount member, the method comprising:
    generating the drive force of the motor in a negative manner when an accelerator operation of the vehicle is disabled, wherein
    in a first region in which the drive force is equal to or above a predetermined lower limit value and equal to or below a predetermined upper limit value, a change rate per unit time of the drive force is limited to or below a predetermined maximum rate that is determined based on a compressed amount of the mount member, and
    in a second region in which the drive force is smaller than the lower limit value and a third region in which the drive force is greater than the upper limit value, the change rate per unit time of the drive force is not limited to or below the maximum rate.

7. A drive force control apparatus for controlling a drive force of a vehicle, comprising:
    a drive source of the vehicle mounted on a vehicle body of the vehicle through a rubber-made mount member;
    the mount member that is linearly compressed only when an external force smaller than a predetermined external force threshold value is applied thereto; and
    a drive force controller that limits a change rate per unit time of the drive force to or below a predetermined maximum rate in a first region in which the drive force is equal to or above a predetermined lower limit value, to make a force, which is caused by a change in the drive force and tilts the drive source rearward to push the mount member, smaller than the external force threshold value, and in a second region in which the drive force is smaller than the lower limit value, does not limit the change rate per unit time of the drive force to or below the maximum rate.

* * * * *